(12) United States Patent
Aulanko et al.

(10) Patent No.: US 7,084,542 B2
(45) Date of Patent: Aug. 1, 2006

(54) STATOR WINDING OF THE ELECTRIC MOTOR OF AN ELEVATOR MACHINE

(75) Inventors: Esko Aulanko, Kerava (FI); Jorma Mustalahti, Hyvinkää (FI); Jussi Huppunen, Lappeenranta (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 10/952,945

(22) Filed: Sep. 30, 2004

(65) Prior Publication Data

US 2005/0062357 A1  Mar. 24, 2005

Related U.S. Application Data

(63) Continuation of application No. PCT/FI03/00341, filed on May 2, 2003.

(30) Foreign Application Priority Data

May 8, 2002  (FI)  .................................. 20020879

(51) Int. Cl.
*H02K 3/48* (2006.01)
*H02K 1/00* (2006.01)
(52) U.S. Cl. ...................... 310/214; 310/216
(58) Field of Classification Search ......... 310/214–216
See application file for complete search history.

(56) References Cited

U.S. PATENT DOCUMENTS

| | | | | |
|---|---|---|---|---|
| 2,190,887 A | * | 2/1940 | Schaeren | 310/127 |
| 2,201,699 A | * | 5/1940 | Myers | 310/214 |
| 2,858,462 A | * | 10/1958 | Knaus | 310/214 |
| 3,943,392 A | * | 3/1976 | Keuper et al. | 310/215 |
| 3,976,902 A | * | 8/1976 | Simmonds | 310/214 |
| 4,425,521 A | * | 1/1984 | Rosenberry et al. | 310/214 |
| 4,427,910 A | * | 1/1984 | Richter et al. | 310/214 |
| 4,761,581 A | * | 8/1988 | Watanabe et al. | 310/214 |
| 5,654,603 A | * | 8/1997 | Sung et al. | 310/214 |
| 6,057,624 A | * | 5/2000 | Ohtake et al. | 310/214 |
| 6,713,928 B1 | * | 3/2004 | Takizawa et al. | 310/214 |

FOREIGN PATENT DOCUMENTS

| | | |
|---|---|---|
| DE | 36 12 112 | 10/1987 |
| EP | 0 307 216 | 3/1989 |
| EP | 0 398 746 | 11/1990 |
| EP | 1 217 714 | 6/2002 |
| GB | 233838 | 5/1925 |
| JP | 2000-261998 | 9/2000 |
| JP | 2002-281709 | 9/2002 |
| WO | WO 98/43340 | 10/1998 |
| WO | WO 02/082619 | 10/2002 |

* cited by examiner

*Primary Examiner*—Tran Nguyen
(74) *Attorney, Agent, or Firm*—Harness, Dickey & Pierce, P.L.C.

(57) ABSTRACT

A stator winding assembly for a stator of an elevator machine motor, in which the stator may include a stator frame with a plurality of stator teeth and one or more slots between given stator teeth. The assembly may include a stator winding adapted to be fitted in the slots, and a winding frame configured to support the stator winding. The winding frame may include a frame bottom in contact with one or more side faces of given slots, and may include a plurality of strip-like elements of ferromagnetic material fitted at mouths of the slots for controlling magnetic flux.

9 Claims, 3 Drawing Sheets

STATOR WINDING OF THE ELECTRIC MOTOR OF AN ELEVATOR MACHINE

PRIORITY STATEMENT

This application is a continuation of, and claims priority under 35 U.S.C. §120 and 35 U.S.C. §365(c) from, PCT International Application No. PCT/FI03/00341 which has an International filing date of May 2, 2003, which designated the United States of America and which claims priority on FINLAND Application Priority Number 20020879 filed May 8, 2002, the entire contents of which are hereby incorporated herein by reference.

BACKGROUND OF THE INVENTION

1. Field of the Invention

The present invention relates to a stator winding assembly for an electric motor of an elevator machine, a stator winding frame and a method of mounting the stator winding assembly to the stator of the elevator machine motor.

2. Description of the Related Art

The stator of electric motors used in elevator machines typically consists of a stator frame having stator teeth and stator slots between the teeth, and a stator winding arranged in the stator frame around the teeth. The stator frame may be laminated from thin plates forming a stator pack. The conductors of the stator winding may be placed directly in the stator slots, e.g., as conductor bundles. The conductors may be held in the slots by means of slot wedges fitted at the upper edge of the slot. The slot wedges may form a dove-tail joint with the upper edge of the slot.

A drawback with prior-art stators is a relatively slow and complicated winding process. In addition, it is typically necessary to prevent conductor movements in the slots caused by mechanical forces. For this purpose, it may be necessary to apply a sealant between the wedge and the conductors, or else each slot wedge may require an adapter piece having friction surfaces on its sides and two side pieces with corresponding friction surfaces on their sides, as described e.g. in patent application FI-A-884154. These solutions are also relatively complicated.

SUMMARY OF THE INVENTION

An example embodiment of the present invention is directed to a stator winding assembly for a stator of an elevator machine motor, in which the stator may include a stator frame with a plurality of stator teeth and one or more slots between given stator teeth. The assembly may include a stator winding adapted to be fitted in the slots, and a winding frame configured to support the stator winding. The winding frame may include a frame bottom in contact with one or more side faces of given slots, and may include a plurality of strip-like elements of ferromagnetic material fitted at mouths of the slots for controlling magnetic flux.

Another example embodiment of the present invention is directed to a stator winding frame configured to support a stator winding of an elevator machine motor. The stator may include a stator frame with a plurality of stator teeth and one or more slots between given stator teeth. The stator winding frame may include a frame bottom and frame sides in contact with the slots, and a plurality of strip-like elements fitted at mouths of the slots for controlling magnetic flux.

Another example embodiment of the present invention is directed to a method of mounting a stator winding assembly to a stator of an elevator machine motor. The stator may include a stator frame with a plurality of stator teeth and one or more slots between given stator teeth for receiving a stator winding. In the method, the stator winding may be fitted within a stator winding frame to form the assembly. The winding frame may include a plurality of locking elements extending therefrom. The assembly may be pushed into the slots so that given locking elements are inserted into corresponding holes of the slots to lock the assembly to the stator frame.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

Figure 1:
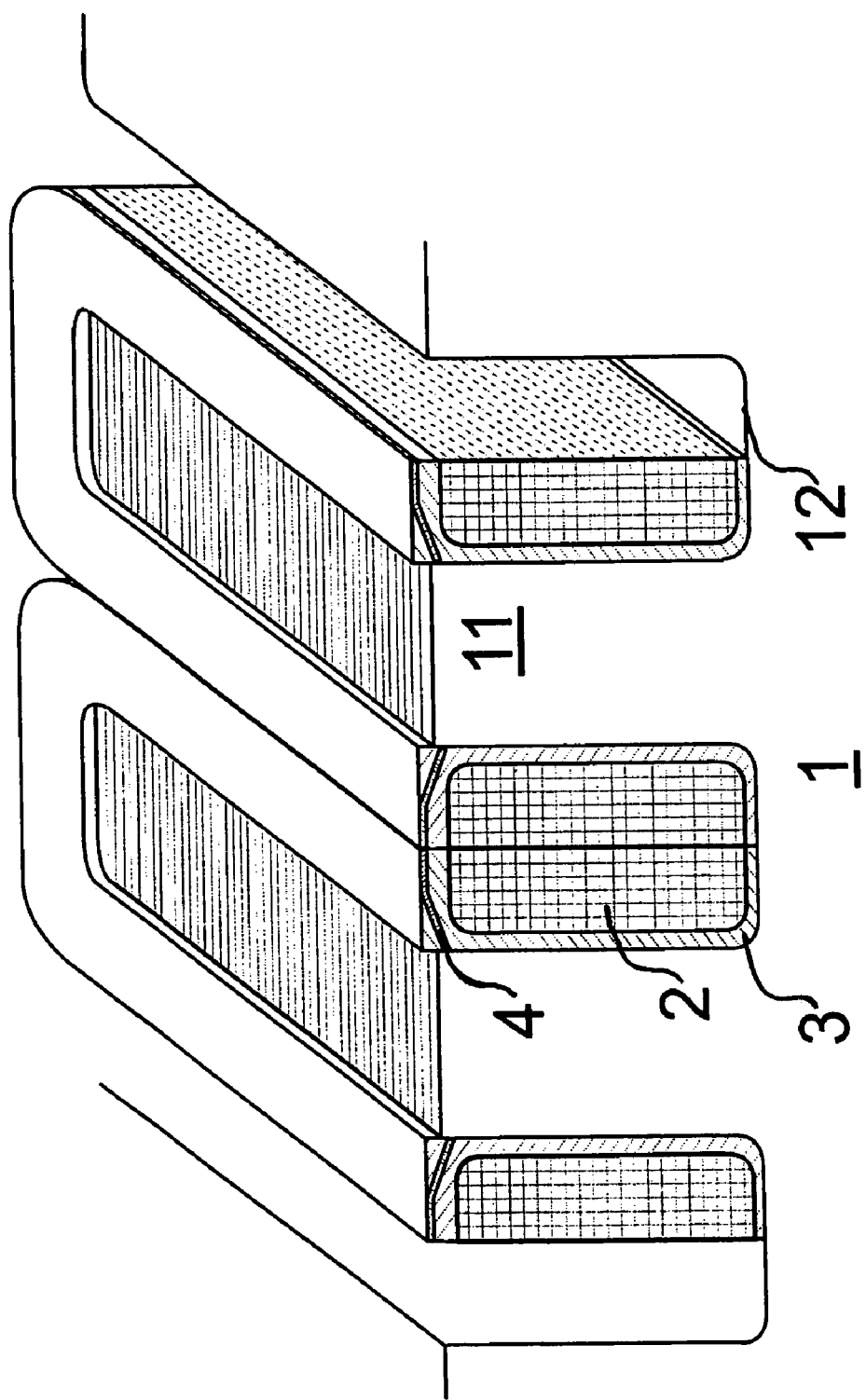
FIG. 1 illustrates a stator according to an example embodiment of the present invention.

FIG. 1 illustrates a stator according to an example embodiment of the present invention. In this example the stator may include a plastic winding frame and a slot stick. As shown in FIG. 1, there is shown a stator for a cage induction motor useable as an elevator hoisting motor. The stator may include a stator frame 1 having a plurality of stator teeth 11 and stator slots 12 between given teeth 11, as shown in FIG. 1. The motor may include a stator winding (field pole coil) 2 placed around a given stator tooth 11. The stator winding is wound around a trough-like plastic winding frame 3. A bottom 31 of the winding frame 3 may be placed against a side face of the tooth 11.

The winding frame 3 may be embodied as a slot stick 4 made of ferromagnetic material, extending over the mouth of the slot 12 and adapted to its shape, for example, so as to control the magnetic flux. The slot stick 4 may be cast within the winding frame 3 on one side of frame 3 (shown at 32), so the slot stick 4 may be firmly fastened in the winding frame 3 and thus cannot become detached. Prior to being mounted on the stator slots 12, the windings 2 may be fitted in the winding frames 3 to form complete 'winding packs', and then mounted on the stator frame 1 by pushing the winding packs into the slots 12.

Figure 2:
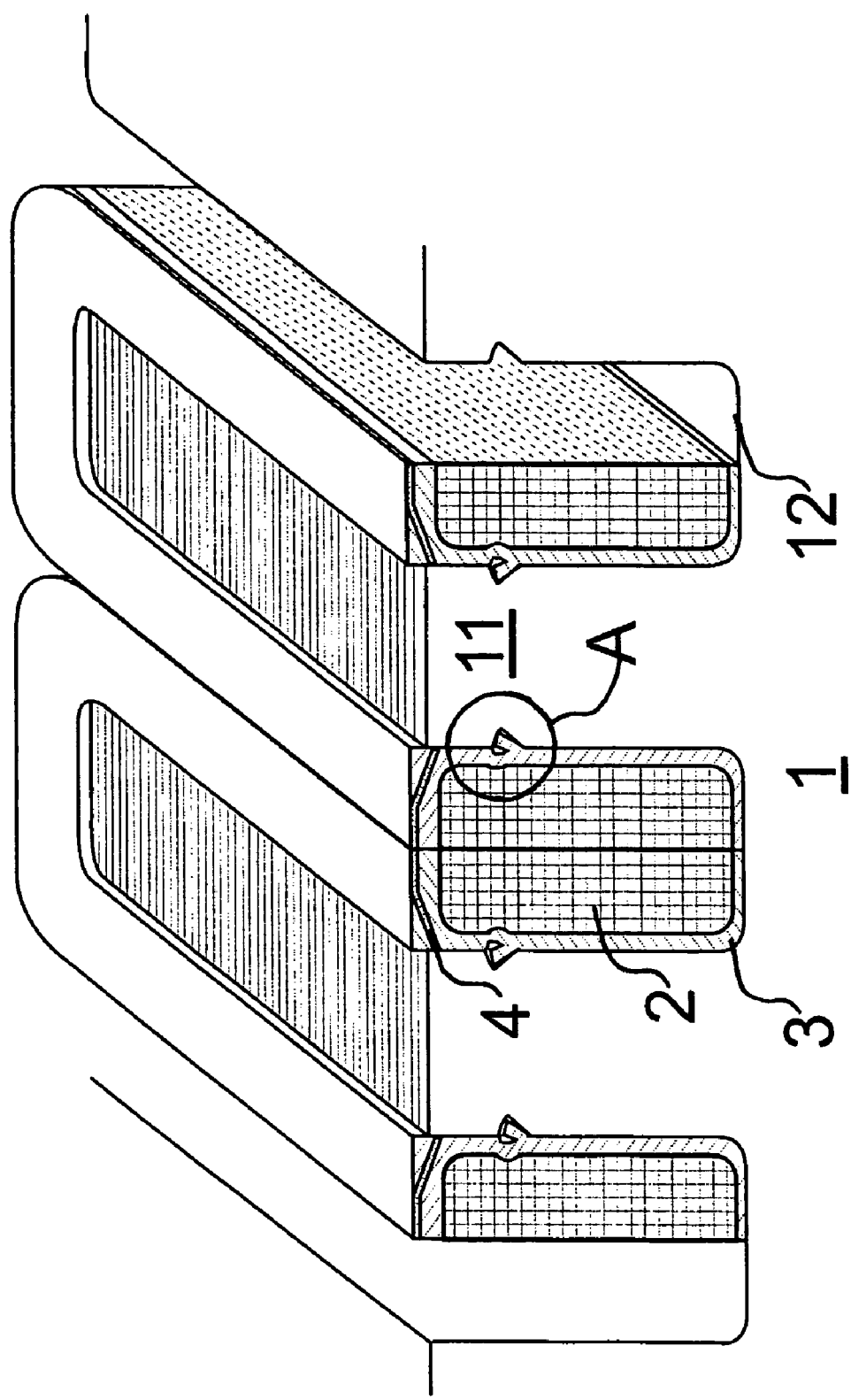
FIG. 2 illustrates a stator according to another example embodiment of the present the invention.
Figure 3:
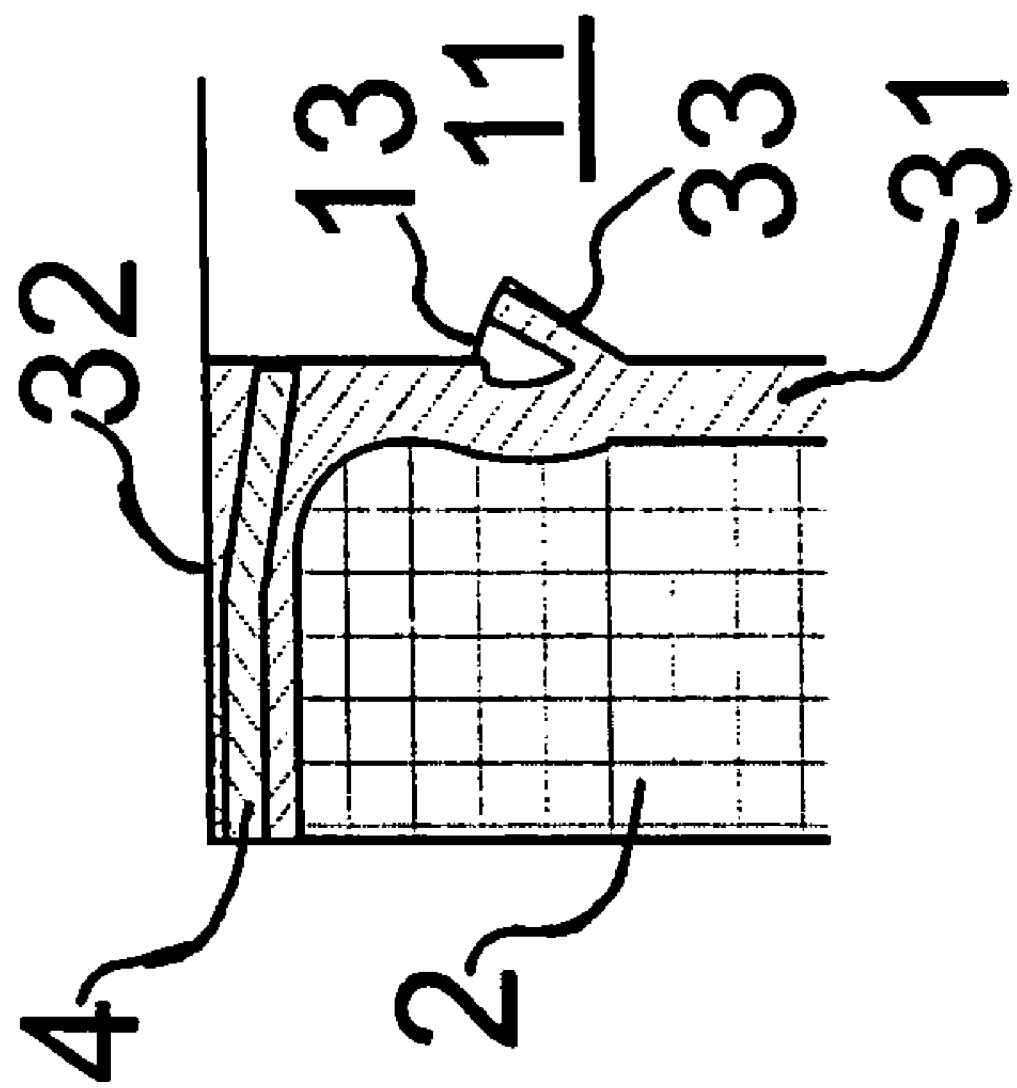
FIG. 3 is a magnified view of detail A in FIG. 2.

FIG. 2 illustrates a stator according to another example embodiment of the present invention, and FIG. 3 is a magnified view of detail A in FIG. 2. In general, the example stator of FIGS. 2 and 3 show a plastic winding frame for an electric motor.

Referring to FIGS. 2 and 3, the bottom 31 of the winding frame 3 includes relatively small elastic locking tongues 33 projecting therefrom. As the stator winding 2 is being pushed into the slot 12, the locking tongues 33 snap into holes 13 provided in the slot 12 of the stator frame 1. The locking elements 33 may thus prevent the field pole coil from moving out from the stator frame 1.

Thus, the example embodiments of the present invention may provide a stator winding assembly that may allow a faster winding process. The example assembly may be implemented using a plastic winding frame of e.g. trough-like shape, around which the stator winding is fitted. The winding frame may be embodied as a slot stick of a ferromagnetic material, and adapted to the shape of the mouth of the slots. The slot stick can be fastened securely by casting it fast on the winding frame, and may be shaped freely.

Since the slot stick is firmly fastened to the coil former, it is not possible for the slot stick to be released. The example assembly and method of mounting the assembly may make it possible to achieve a simple, fast and economical winding process, especially because the windings can be prepared as complete packs before being mounted in the stator slots.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

The invention claimed is:

1. A stator winding assembly for a stator of an elevator machine motor, the stator including a stator frame with a plurality of stator teeth and one or more slots between given stator teeth, comprising:
   a stator winding adapted to be fitted in the slots, and
   a winding frame configured to support the stator winding, the winding frame having a frame bottom in contact with one or more side faces of given slots, the winding frame including a plurality of strip-like elements of ferromagnetic material fitted at mouths of the slots for controlling magnetic flux, and the plurality of strip-like elements being embedded in the winding frame.

2. The assembly of claim 1, wherein the strip-like elements are shaped so as to follow the form of the mouth of the slot.

3. The assembly of claim 1, wherein
   the winding frame includes one or more flexible locking elements projecting from the frame bottom,
   the locking elements are adapted to be fit into holes provided in the slots, and are inserted into the holes to lock the winding frame and stator winding to the stator frame, as the winding frame is being pushed into the slots.

4. The assembly of claim 1, wherein the winding frame is has a substantially trough-like shape, the stator winding configured to be wound around the trough-shaped winding frame.

5. The assembly of claim 1, wherein the winding frame is composed of a plastic-like material.

6. The assembly of claim 3, wherein the flexible locking elements are composed of the same material as the winding frame.

7. A stator winding frame configured to support a stator winding of an elevator machine motor, the stator including a stator frame with a plurality of stator teeth and one or more slots between given stator teeth, the stator winding frame comprising:
   a frame bottom and frame sides, at least one frame side in contact with a given slot, and
   a plurality of strip-like elements fitted at mouths of the slots for controlling magnetic flux, and the plurality of strip-like elements being embedded in the winding frame.

8. The stator winding frame of claim 7, further comprising:
   one or more flexible locking elements projecting from the frame bottom and adapted to be inserted into holes of corresponding slots to lock the stator winding frame and stator winding to the stator frame, as the winding frame is being pushed into the slots.

9. The stator winding frame of claim 7, wherein the strip-like elements are cast as part of the frame so as to form a portion of a side of the winding frame.

* * * * *